United States Patent
Rutherford et al.

(10) Patent No.: US 9,444,255 B2
(45) Date of Patent: Sep. 13, 2016

(54) METHOD AND APPARATUS FOR CONTROL

(75) Inventors: Christopher Rutherford, Schaerbeek (BE); Philip Marivoet, Tienen (BE)

(73) Assignee: SONY CORPORATION, Tokyo (JP)

( * ) Notice: Subject to any disclaimer, the term of this patent is extended or adjusted under 35 U.S.C. 154(b) by 621 days.

(21) Appl. No.: 13/274,862

(22) Filed: Oct. 17, 2011

(65) Prior Publication Data
US 2012/0143386 A1 Jun. 7, 2012

(30) Foreign Application Priority Data
Dec. 2, 2010 (GB) .................................. 1020400.6

(51) Int. Cl.
G06F 1/26 (2006.01)
H01M 10/48 (2006.01)
H02J 3/28 (2006.01)
H02J 3/38 (2006.01)
H02J 13/00 (2006.01)

(52) U.S. Cl.
CPC .. H02J 3/28 (2013.01); H02J 3/38 (2013.01); H02J 13/0086 (2013.01); H02J 13/0006 (2013.01); Y02B 70/3266 (2013.01); Y02E 40/72 (2013.01); Y02E 60/722 (2013.01); Y04S 10/12 (2013.01); Y04S 10/14 (2013.01); Y04S 20/242 (2013.01)

(58) Field of Classification Search
CPC .......... H02J 3/38; H02J 13/0086; H02J 3/28; H02J 13/0006; Y02E 40/72; Y02E 60/722; Y02B 70/3266; Y04S 10/12; Y04S 20/242; Y04S 10/14
USPC ...................................... 700/297; 429/90, 91
See application file for complete search history.

(56) References Cited

U.S. PATENT DOCUMENTS

| | | | | |
|---|---|---|---|---|
| 5,422,558 A | * | 6/1995 | Stewart | 320/120 |
| 5,698,967 A | * | 12/1997 | Baer et al. | 320/152 |
| 5,701,068 A | * | 12/1997 | Baer et al. | 320/119 |
| 6,522,955 B1 | * | 2/2003 | Colborn | 700/286 |

(Continued)

FOREIGN PATENT DOCUMENTS

| | | |
|---|---|---|
| CN | 1689208 A | 10/2005 |
| CN | 101098279 A | 1/2008 |

(Continued)

OTHER PUBLICATIONS

United Kingdom Search Report dated Jun. 10, 2011, in Application No. GB1020400.6 filed Dec. 2, 2010.

(Continued)

*Primary Examiner* — Charles Kasenge
(74) *Attorney, Agent, or Firm* — Oblon, McClelland, Maier & Neustadt, L.L.P.

(57) ABSTRACT

A method of controlling the connection of a collection of a plurality of electricity providing devices to an electrical power network is described. In this, the plurality of electricity providing devices having a communication line therebetween and the method comprises receiving a message at a first electricity providing device from a controlling device and, in response to the message: connecting the first electricity providing device to the electrical power network; and sending, from the first electricity providing device to a second electricity providing device, a second message containing data in response to which the second electricity providing device is connected to the electrical power network.

19 Claims, 8 Drawing Sheets

(56) References Cited

U.S. PATENT DOCUMENTS

| | | | |
|---|---|---|---|
| 7,262,694 B2* | 8/2007 | Olsen et al. | 340/531 |
| 7,411,315 B2* | 8/2008 | Gottlieb et al. | 307/66 |
| 7,579,842 B2* | 8/2009 | Hunter et al. | 324/426 |
| 7,590,472 B2* | 9/2009 | Hakim et al. | 700/295 |
| 7,783,389 B2* | 8/2010 | Yamada et al. | 700/286 |
| 7,852,042 B2* | 12/2010 | Froeschl et al. | 320/101 |
| 7,957,846 B2* | 6/2011 | Hakim et al. | 700/295 |
| 8,198,862 B2* | 6/2012 | Zhang et al. | 320/118 |
| 8,242,745 B2* | 8/2012 | Zhang et al. | 320/119 |
| 8,319,358 B2* | 11/2012 | Curry et al. | 290/1 A |
| 8,359,132 B2* | 1/2013 | Laberteaux | B60L 11/184 320/104 |
| 8,803,362 B2* | 8/2014 | Schmiegel | H02J 3/383 307/85 |
| 8,872,379 B2* | 10/2014 | Ruiz | B60L 11/1816 307/66 |
| 2002/0011823 A1* | 1/2002 | Lee | G06F 1/1632 320/137 |
| 2005/0280528 A1* | 12/2005 | Olsen et al. | 340/531 |
| 2006/0122738 A1* | 6/2006 | Yamada et al. | 700/295 |
| 2006/0193095 A1* | 8/2006 | Hunter et al. | 361/64 |
| 2006/0194082 A1* | 8/2006 | Tucker et al. | 700/286 |
| 2008/0048854 A1* | 2/2008 | Olsen et al. | 340/531 |
| 2009/0102124 A1* | 4/2009 | Tien et al. | 320/124 |
| 2009/0212626 A1* | 8/2009 | Snyder et al. | 307/10.1 |
| 2010/0076825 A1 | 3/2010 | Sato et al. | |
| 2010/0138058 A1* | 6/2010 | Kirchner et al. | 700/286 |
| 2010/0259043 A1* | 10/2010 | Balsamo | 290/7 |
| 2011/0080044 A1* | 4/2011 | Schmiegel | H02J 3/383 307/23 |
| 2011/0125335 A1* | 5/2011 | Boss et al. | 700/286 |
| 2011/0202192 A1* | 8/2011 | Kempton | 700/291 |
| 2011/0204720 A1* | 8/2011 | Ruiz | B60L 11/1816 307/66 |
| 2011/0313603 A1* | 12/2011 | Laberteaux | B60L 11/184 701/22 |
| 2012/0005031 A1* | 1/2012 | Jammer | B60L 11/1816 705/16 |
| 2012/0101639 A1* | 4/2012 | Carralero et al. | 700/286 |

FOREIGN PATENT DOCUMENTS

| | | | |
|---|---|---|---|
| EP | 2 293 409 A2 | 3/2011 | |
| JP | 2003-17134 | 1/2003 | |
| JP | 2008-236902 | 10/2008 | |
| JP | 2010-81722 | 4/2010 | |
| WO | WO 2010042550 A2 * | 4/2010 | B60L 11/1824 |
| WO | WO 2011/102855 A1 | 8/2011 | |

OTHER PUBLICATIONS

Combined Chinese Office Action and Search Report issued Sep. 1, 2014 in Patent Application No. 201110402636.5 (with English language translation).

Japanese Office Action issued on Jul. 21, 2015 in Japanese Application No. 2011-261270 (5 pages).

\* cited by examiner

| | 905 | 910 | 915 | 900 |
|---|---|---|---|---|
| | Group A | Charge | Reliability of connection | |
| | Node 1 | 0.5kW | 98% | |
| | Node 2 | 0.1kW | 90% | |
| | Node 3 | 1.0kW | 75% | |
| | ... | | | |
| | Node N | 0.6kW | 93% | |
| | | | | |
| | Group B | | | |
| | Node 1 | 0.1kW | 99% | |
| | Node 2 | 0.9kW | 93% | |
| | Node 3 | 1.0kW | 96% | |
| | ... | | | |
| | Node N | 0.8kW | 87% | |
| | ... | | | |
| | Group N | | | |
| | Node 1 | 0.6kW | 99% | |
| | Node 2 | 0.9kW | 97% | |
| | Node 3 | 1.0kW | 89% | |
| | ... | | | |
| | Node N | 0.5kW | 88% | |

FIG. 8

METHOD AND APPARATUS FOR CONTROL

BACKGROUND OF THE INVENTION

1. Field of the Invention

The present invention relates to a method and apparatus for control.

2. Description of the Prior Art

Power generation companies need to balance the electrical power grid. This means that the power generation companies need to ensure that the amount of electricity provided to a local area is sufficient to meet the demand of the users in that area at any given time. Failure to perform this balancing correctly can result in so-called "brown outs" where the supply voltage temporarily drops to a very low level due to failure of the power companies to meet current demand or so-called "black outs" where the supply is lost.

As demand varies considerably during the day, it is difficult to ensure that all the users' demands are met without providing over capacity on the network.

In order to achieve this, power generation companies tend to have electrical generation capacity on standby which can generate power very quickly. For example, hydroelectric power generation can be brought on-line within a minute which can satisfy a sharp increase in power consumption. However, the hydroelectric generators typically are located in remote areas of a country whereas high power demand is located in urban areas with large population concentrations. This means that it is sometimes difficult to transfer the electricity from the area of rapid production to the area of consumption.

There is a need to provide electrical energy in highly populated areas very quickly to deal with demand. It is an aim of the present invention to address this problem.

SUMMARY OF THE INVENTION

According to a first aspect, there is provided a method of controlling the transfer of electricity between a collection of a plurality of electricity storage devices and an electrical power network, the plurality of electricity storage devices having a communication line therebetween, the method comprising: receiving a message at a first electricity storage device from a controlling device and, in response to the message: transferring electricity between the first electricity storage device and the electrical power network; and sending, from the first electricity storage device to a second electricity storage device, a second message containing data in response to which the second electricity storage device transfers electricity to or from the electrical power network.

This enables the electricity storage devices to be controlled by a server. This allows the electricity network to be better balanced. Moreover, with this particular method, the propagation of the message is quick. This allows many more storage devices to react to changes in the electricity network quickly. Also, the number of storage devices controlled by one server increases using this method.

The method may further comprise: receiving, at the first electricity storage device, an acknowledgment from the second electricity storage device, and in response to said acknowledgment and the transfer of electricity between the first electricity storage device and the electrical power network, the first electricity storage device sends an acknowledgment to the controlling device.

The controlling device may be a server or a further electricity storage device.

The method may further comprise: sending, from the first electricity storage device to a third electricity storage device, a third message containing data in response to which the third electricity storage device transfers electricity to or from the electrical power network, receiving from the third electricity storage device an acknowledgment and in response to said acknowledgment from said second and third electricity storage devices; sending the acknowledgment to the controlling device.

The first electricity storage device may have an identifier stored thereon, the identifier uniquely identifying the second electricity storage device in the collection whereby the identifier is used to route the second message to the second electricity storage device.

The method may further comprise: selecting a different electricity storage device within the collection as the second electricity storage device, wherein the different electricity storage device has a unique identifier attributed thereto, and updating the identifier stored in the first electricity storage device to be the different unique identifier, wherein the selection is made in dependence upon the reliability of the communication line to the second electricity storage device and to the different electricity storage device.

The reliability of the communication line to the second electricity storage device may be below a threshold, and the reliability of the communication line to the different electricity storage device may be above that of the communication line to the second electricity storage device.

The method may further comprise periodically measuring the energy in the second electricity storage device and sending the measured energy value, and an identifier that uniquely identifies the second electricity storage device, to the first electricity storage device.

Any one of the first, second or third electricity storage device may transfer energy to or from the electrical power network.

According to a second aspect, there is provided an electricity storage device operable to provide electrical energy to an electrical power network, comprising: a communication interface operable to communicate with a second, different, electricity storage device and to receive a message at the electricity storage device from a controlling device and, a controller operable in response to the message to: transfer electricity between the electricity storage device and the electrical power network; and, using the communication interface to send to the second electricity storage device, a second message containing data in response to which the second electricity storage device transfers electricity to or from the electrical power network.

The communication interface may be further operable to receive an acknowledgment from the second electricity storage device, and in response to said acknowledgment and the transfer of electricity between the first electricity storage device and the electrical power network, the communication interface may be operable to send an acknowledgment to the controlling device.

The controlling device may be a server or a further electricity storage device.

The communication interface may be operable to send to a third electricity storage device, a third message containing data in response to which the third electricity storage device transfers electricity to or from the electrical power network, and the communication may be further operable to receive from the third electricity storage device an acknowledgment and in response to said acknowledgment from said second and third electricity storage devices; the communication interface may be operable to send the acknowledgment to the controlling device.

The device may comprise a memory operable to store an identifier thereon, the identifier uniquely identifying the second electricity storage device in the collection whereby the identifier is used to route the second message to the second electricity storage device.

The controller may be further operable to select a different electricity storage device within the collection as the second electricity storage device, wherein the different electricity storage device may have a unique identifier attributed thereto, and to update the identifier stored in the memory to be the different unique identifier, wherein the selection may be made in dependence upon the reliability of the communication line with the second electricity storage device and to the different electricity storage device.

The reliability of the communication line to the second electricity storage device may be below a threshold, and the reliability of the communication line to the different electricity storage device may be above that of the communication line to the second electricity storage device.

The device may further comprise a charge measurement device operable to periodically measure the available energy and wherein the communication interface may be operable to send the measured energy value, and an identifier that uniquely identifies the second electricity storage device, to the controller.

Any of the device or the first, second or third device may be operable to transfer energy to or from the electricity network.

According to another aspect, there is provided a computer program comprising computer readable instructions which, when loaded onto a computer, configure the computer to perform a method according to any one of the aforesaid embodiments.

BRIEF DESCRIPTION OF THE DRAWINGS

The above and other objects, features and advantages of the invention will be apparent from the following detailed description of illustrative embodiments which is to be read in connection the accompanying drawings, in which:

FIG. 8 shows a database according to embodiments stored in a server located in the embodiments of FIGS. 3 and 6.

DESCRIPTION OF THE PREFERRED EMBODIMENTS

Figure 1:
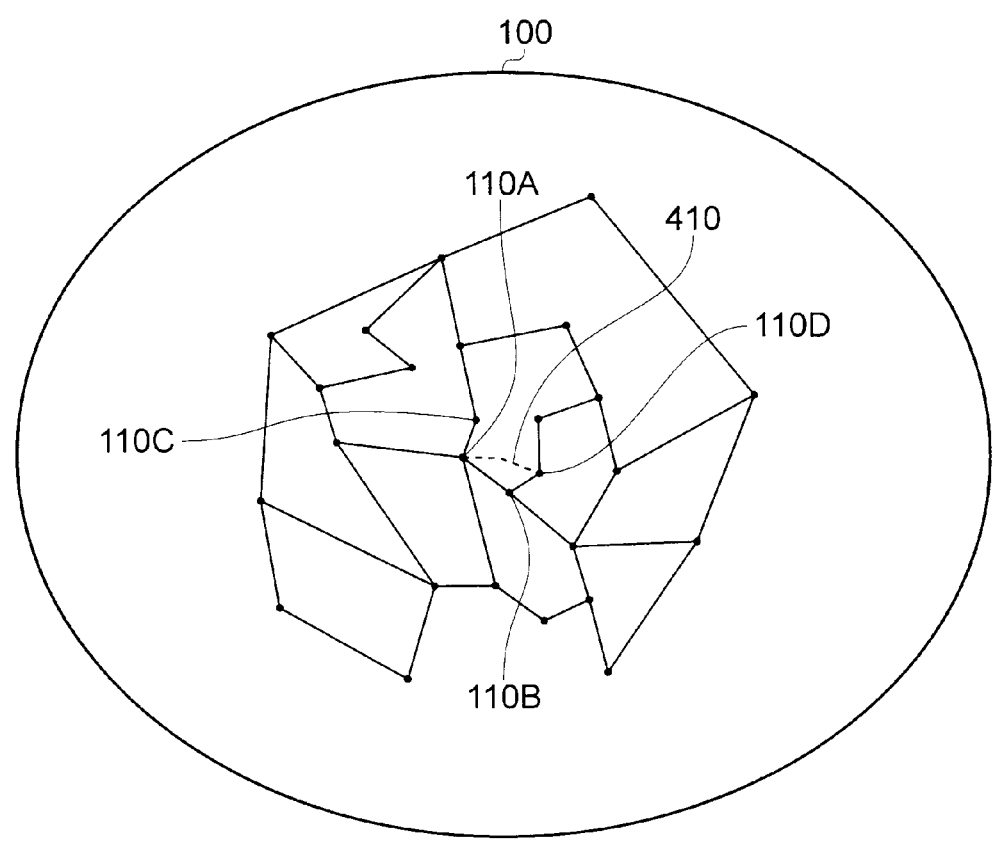
FIG. 1 shows a collection of local supply nodes.

Referring to FIG. 1, a collection of local supply nodes is shown. For clarity, four local supply nodes 110A-110D is shown. Each of the local supply nodes 110A-110D is connected to the electrical power network. In other words, each local supply node 110A-110D is connected to the mains supply which feeds electricity to a number of dwellings. Although one embodiment of a local supply node will be explained with reference to FIG. 2, a local supply node in general is a power storage device which can supply a predetermined amount of electricity to the electrical power network in a short period of time. This may be an electrical storage unit, such as a battery bank, as in the case of FIG. 2. The purpose of the collection of local supply nodes is therefore to supply a predetermined amount of electricity to the power network upon demand and within a predetermined lead time. The amount of electricity to be provided to the power network is determined typically by consumer demand and the amount of lead time is determined by national regulation. For example, the power network will require 1 MW of electricity with 30 seconds lead time. As will be appreciated, this is a large amount of electricity to be provided with short notice. Moreover, where there is low demand, the battery banks may charge with electricity so that they can provide the electricity upon demand.

In FIG. 1, each local supply node is connected to an adjacent local supply node using the electrical power network. This connection is shown in FIG. 1 as a solid black line connecting one local supply node with another local supply node. The collection of local supply nodes are, in embodiments, grouped according to geographical location. For example, each of the local supply nodes in one collection may be connected to the same electrical sub-station. However, any appropriate kind of grouping is envisaged, for example the grouping could be by energy providers.

As will be explained later, the local supply nodes are also capable of communicating with one another. This communication may be between local supply nodes that are connected to each other electrically. Alternatively, or additionally, local supply nodes which are not connected to each other electrically may also communicate with one another. An example of this is shown in FIG. 1, where node 110A and node 110D communicate with one another, but are not electrically connected to one another. The communication line 410 is shown with a dashed line. The communication line 410 may be provided when the reliability of a connection of a node is below a threshold as will be explained later.

The local supply nodes may communicate with one another over the Internet as each node may have a specific Internet Protocol (IP) address. As will be explained, in embodiments, each local supply node needs only to be able to communicate with a subset of other local supply nodes in each collection 100. In other words, there is no requirement for each local supply node to communicate with each of the other local supply nodes in the collection 100. This reduces the amount of communication capacity required for each collection 100 of local supply nodes.

In one embodiment, one or more local supply node in one collection may communicate with one or more local supply nodes in one or more other collections. This substantially reduces the amount of data traffic between the local supply nodes. Moreover, this arrangement rapidly increases the speed at which each local supply node can supply the required amount of energy to the power network. This will be explained with reference to FIG. 6.

Figure 2:
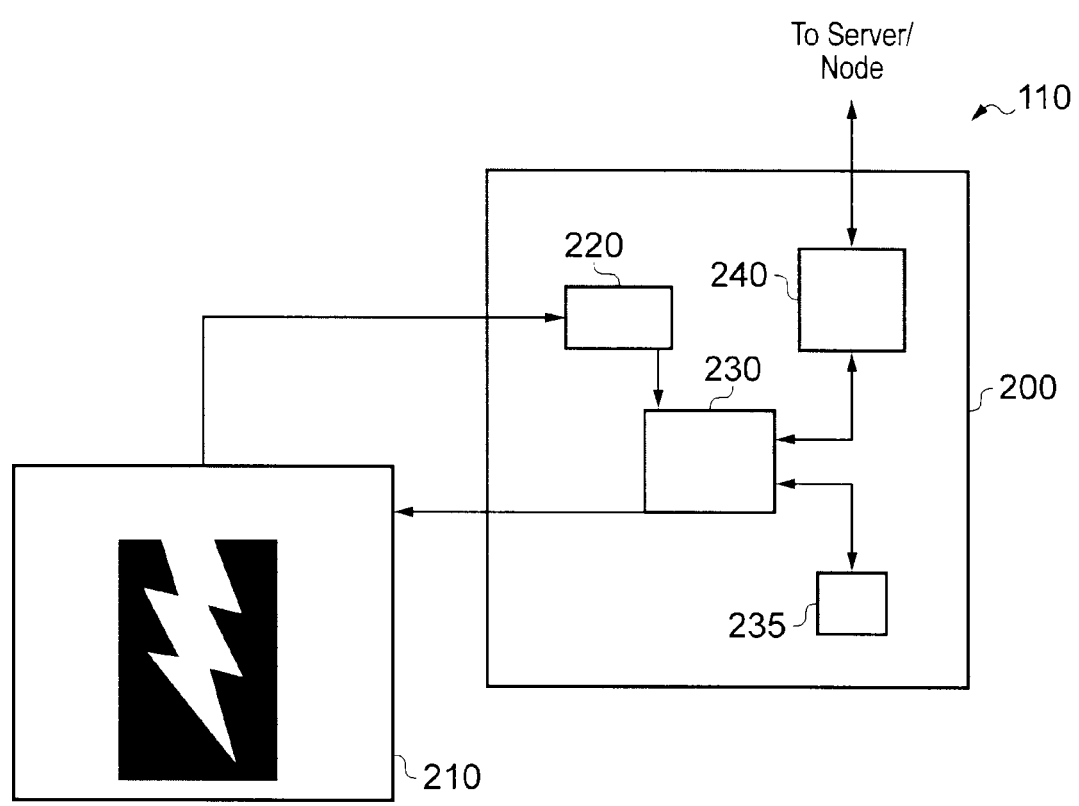
FIG. 2 shows a local supply node according to embodiments of the present invention.

Referring to FIG. 2 a power provider 210 coupled to a node control device 110 is shown. The power provider 210 is in embodiments a large battery bank. The battery bank is connected to the power grid (not shown) when required to either charge or to provide energy to the network. The battery bank is located in the home and is charged when the electricity tariff is low, for example at 3 am, or is charged by locally generated power such as by a solar panel or the like. The battery bank is connected to the power network to provide energy when the node control device 110 receives a connection message over the communication line.

The battery bank is connected to a charge analyser 220 located within the node control device 110. The charge analyser 220 measures the amount of charge left in the battery bank 210. This charge information is passed to a control unit 230 which, in embodiments is a microprocessor running computer readable software code. The control unit 230 controls the battery bank 210 to either charge by drawing energy from the power network when the electricity tariff is low or where there is low demand, or indeed to discharge by providing energy to the power network when required. The control unit 230 is connected to memory 235 which stores the computer program and other data. The control unit 230 is also provided with information regarding the amount of energy provided to the battery bank 210 and the amount of energy provided by the battery bank 210. Additionally, the tariff paid for the energy is determined. The tariff information which is a charge per energy unit and varies during the day is stored in the memory 235. By calculating the amount of energy taken from the network or placed on the network enables the cost of the battery bank 210 to be monitored. This cost information may be passed to an overall energy monitoring system which provides the user with a breakdown of the overall cost and energy consumption in the dwelling.

The control unit 230 is connected to a communication interface 240. The communication interface 240 receives the charge information from the control unit 230 and provides this to either a server or to another local supply node. The communication interface 240 may communicate wirelessly with the server or node or using a wired connection. Moreover, the communication interface 240 may use the electrical connection between the nodes to communicate. The communication interface 240 may receive any data from the server or node and may communicate this data to the control unit 230. This data may include information requesting that a specified amount of energy be provided onto the power network. Moreover, the communication interface 240 is also capable of communicating the overall cost and energy consumption to the energy monitoring system over a home network.

Figure 3:
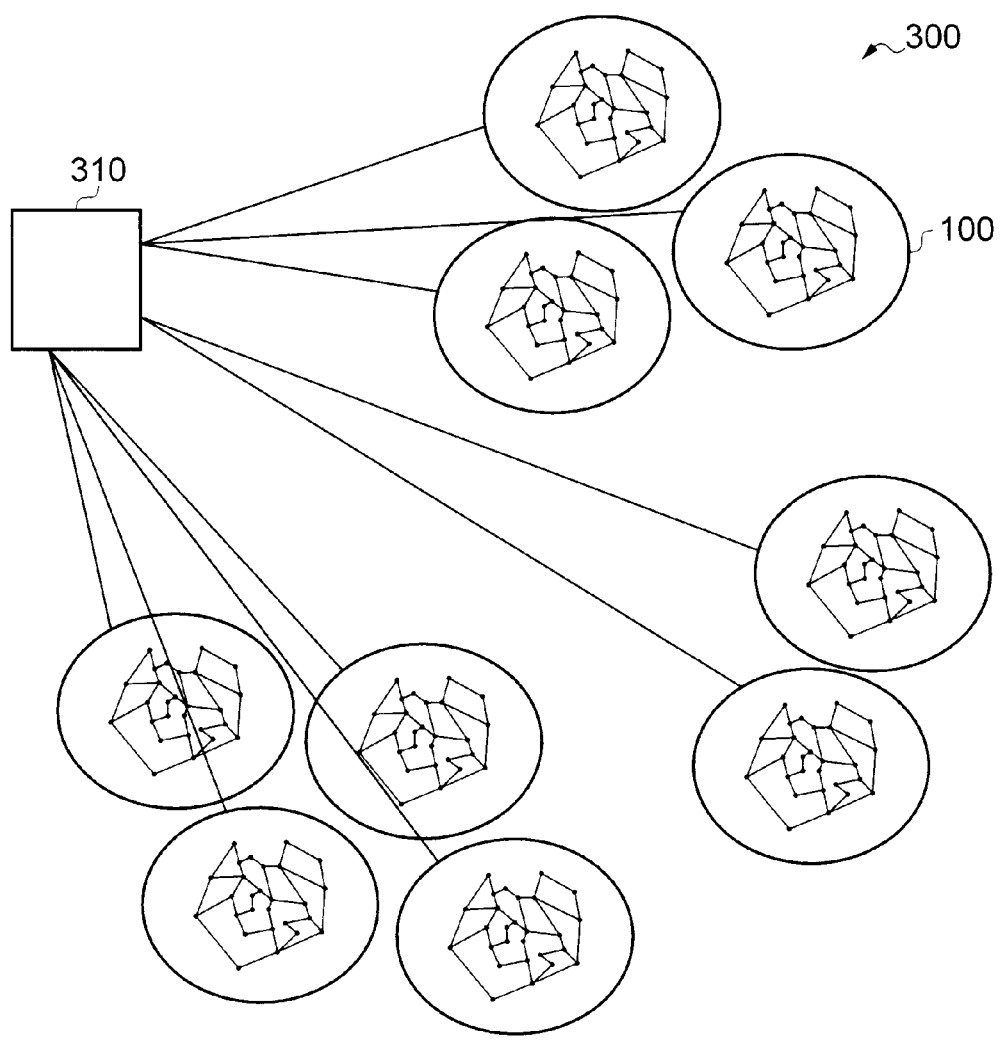
FIG. 3 shows a network of collections of local supply nodes according to an embodiment of the present invention.

Referring to FIG. 3, a network 300 of local supply nodes collections 100 is shown. In this embodiment, each local supply node collection 100 is connected to a server 310. Specifically, a first local supply node in each collection is selected to communicate with the server 310. The first local supply node which communicates with the server 310 may be selected because it has the most reliable connection, or using some other selection criteria such as distance to a server or time of day. The first local supply node has bi-directional communication with the server 310. Additionally, the first local supply node communicates with a plurality of other local supply nodes within the local supply node collection 100.

The server 310 has a database located therein. The database stores information identifying each local supply node in each collection. Additionally, and as will be explained with reference to FIG. 8, the database stores information detailing the amount of energy available from each local supply node and the reliability of the connection to the local supply node. In order to ensure that the database stored within the server 310 is correct, each local supply node periodically provides the charge information to the server 310. So that the server 310 can associate the charge information to the correct local supply node in the database, the local supply node also provides identification information which identifies the local supply node. The identification information must be unique compared with the other local supply nodes in the collection. The identification information will be provided when the local supply node first becomes part of the collection and may be allocated by the selected local supply node or may be allocated by the server 310.

Figure 4:
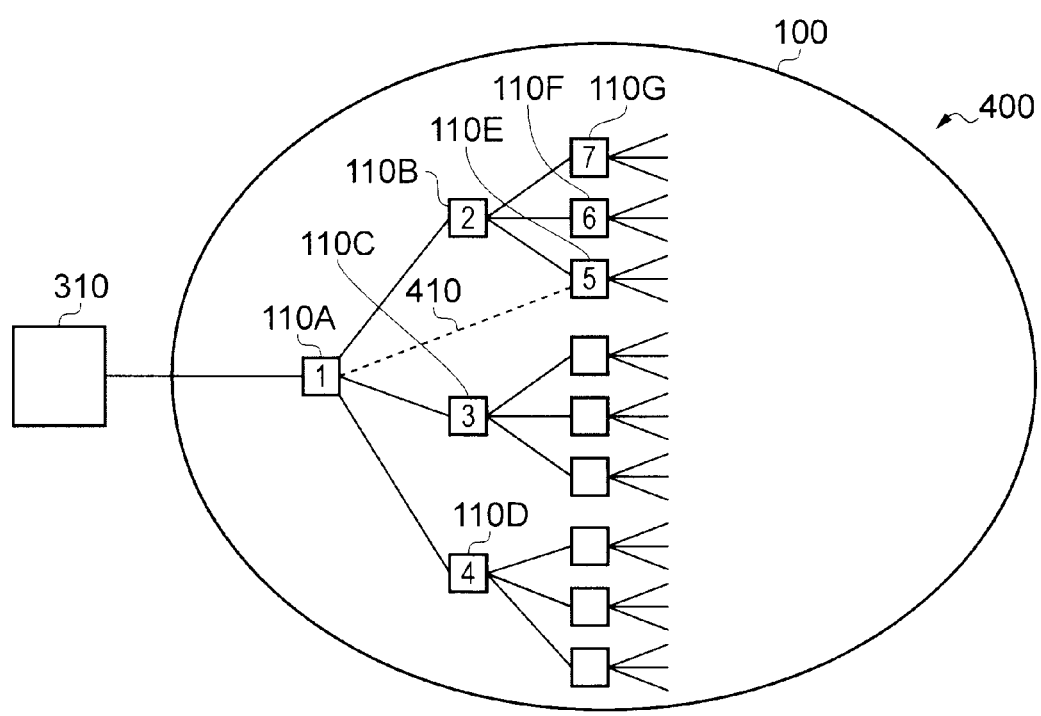
FIG. 4 shows a diagram explaining the messaging amongst the collection of local supply nodes of FIG. 3.

Referring to the embodiment of FIG. 4, a mechanism is described by which the server 310 communicates with the local supply nodes 110. The server 310 receives from the power network an indication that extra power needs to be provided to the network in a particular geographical location. The server 310 identifies the collection of local supply nodes which are closest to the relevant geographical location. The server 310 then determines whether there is enough energy in the collection 100 of local supply nodes to service the request. This is achieved by analysing the database. If there is insufficient energy in the collection 100, the server 310 selects a second collection on the basis of the geographical location. If no collection located in a suitable location is found, the server 310 informs the power network so that the power network may find an alternative mechanism to provide the required energy.

If the collection chosen by the server 310 does have sufficient energy capability, the server 310 sends a message to the first local supply node 110A. As the first local supply node 110A is the node which is directly connected to the server 310, the connection between the server 310 and the first local supply node 110A must be the most reliable in the collection. As the first local supply node 110A is the most reliable, the first local supply node 110A is a so-called first tier node. In order that the first local supply node 110A may determine that the message is genuine, the server 310 encrypts the message 310 with a private key. The public key that corresponds to the server private key is stored in the memory 235 of the first local supply node 110A. The first supply node 110A decrypts the message with the public key of the server 310. The public key of the server 310 is also stored in the memory 235 and is received during an authentication process performed prior to receipt of the message.

Upon correct decryption, the message is deemed valid. The message from the server 310, in embodiments, requests that the first local supply node 110A enables the connection of its battery pack to the power network and that the first local supply node 110A inform other nodes with which it communicates to enable the connection of their battery pack to the power network. The list of the other nodes is stored in memory 235. Specifically, the IP address of each of the other local supply nodes is stored in the memory 235 although any form of identification may be stored.

So, the first local supply node 110A enables the initialisation of its battery pack to the power network allowing the battery pack to either charge or discharge via the power network. The decision whether to either charge or discharge the battery pack via the power network will be made in dependence on the content of the message. In other words, the message will instruct the battery pack to either charge or discharge via the network. A second message which is to be sent to each local supply node 110 with which the first local supply node 110A communicates is encrypted using a first local supply node private key.

The first local supply node private key is also stored in memory 235 of the first local supply node 110A. This second message is sent to a second local supply node 110B, a third local supply node 110C and a fourth local supply node 110D.

Further, the second message is sent to a fifth local supply node 110E. The second message, like the first message, instructs the respective local supply nodes to connect their battery packs to the power generation network. As the second to fifth local supply nodes 110A to 110E are connected to the first local supply node 110A (which is a first tier node), the second to fifth local supply nodes are so-called "second tier nodes".

It should be noted here that as the first local supply node 110A decrypts the first message from the server 310 and then encrypts a second message using the first local supply node private key, if the security of the first local supply node 310A was compromised, then it would be possible for an unauthorised second message to be sent to the second tier nodes. This would compromise the integrity of the system.

In order to improve the security, the first local supply node 310A could generate the encrypted second message in a trusted platform module or some other secure environment. This could then be supplied to the second tier nodes using an appropriate method.

Alternatively, instead of the second message being generated by the first local supply node 310A, the first local supply node 310A could simply forward the first message that was encrypted by the server 310 to the second tier supply nodes. In other words, the second message would be the same as the first message that was encrypted by the server 310. The second tier supply nodes would then only require knowledge of the public key of the server 310 and would not need to store any private key. The public key of the server 310 can be propagated by the first node 310A or may be retrieved directly from the server 310. This has two advantages. Firstly, the security of the system is more secure because without knowing the private key of the server 310, an unauthorised message would not be able to be generated by a local supply node and validated in the higher order tier. Secondly, as no private key needs to be stored within the local supply nodes, memory usage is less and any measures included in the local supply node to secure the private key need not be present.

After the second message is sent to each of the second to fifth local supply nodes, a flag is placed against each node in the memory 235 of the first local supply node 110A indicating that the second message has been sent. The flag is reset after receipt of an acknowledgement from each of the second to fifth local supply nodes is received back at the first local supply node 110A. In order to ensure that the second message is correctly received at the local supply nodes, if after a period of time (for example 100 ms) the flag has not been reset, the message is resent to the flagged node.

Each of the second to fifth local supply nodes 110B-110E decrypts the received message using the public key corresponding to the first local supply node private key, or the public key of the server 310 as appropriate, and which is stored in the memory 235 of the respective second to fifth local supply nodes 110B-110E. Successful decryption validates the authenticity of the message from the first local supply node 110A.

After successful validation, each of the second to fifth local supply nodes 110B-110E initialises the connection of their respective battery pack to the power network to allow the battery pack to either charge or discharge via the network. Each of the second to fifth local supply nodes 110B-110E then generate a third message which is to be sent to each local supply node 110 with which each of the second to fifth local supply nodes communicates. This third message may be either generated within the respective local supply nodes and encrypted using respective second to fifth local supply node private keys and sent to the appropriate local supply nodes for decryption and validation. Alternatively, the third message may be the first message which is encrypted using the private key of the server 310. As these local supply nodes are connected to second tier nodes, these local supply nodes are so-called "third tier nodes".

As can be seen, the second local supply node 110B sends the third message to the fifth local supply node 110E and a sixth local supply node 110F and a seventh local supply node 110G. As will be appreciated, the fifth local supply node 110E receives both the second message from the first local supply node 110A and the third message from the second local supply node 110B. This duplication is provided in case the second message from the first local supply node 110A is not received by the second local supply node 110B. This is useful in the case that, for example, the connection between the first and second node is not reliable. This duplication means that the fifth local supply node 110E will be able to continue the propagation of the message to a fourth tier of local supply nodes.

The local supply nodes that receive and successfully decrypt the third message then initialise their respective battery packs to be connected to the power network to allow the battery pack to either charge or discharge via the network and send the message on to other local supply nodes if appropriate using the same technique as herein described.

In order to ensure that the network provides the amount of energy that is expected, each local supply node generates an acknowledgement that the respective battery pack has been initialised for connection to the power network to allow the battery pack to either charge or discharge via the network. There are a number of different mechanisms by which the acknowledgement may be returned to the server 310 and/or the node in the preceding tier.

Firstly, the local supply node that has just connected to the power network may generate an acknowledgment as soon as the battery pack has been connected to the power network. The acknowledgment may then be sent directly to the local supply node in the preceding tier. For example, as soon as the fifth local supply node 110E has connected to the power network, the fifth local supply node 110E sends the acknowledgement to the first local supply node 110A over line 410. Also, the fifth local supply node 110E will also send the acknowledgement to the second local supply node 110B. Upon receipt of the acknowledgment, the flag associated with the fifth local supply node 110E is reset in the memory 235 of the first local supply node 110A. The acknowledgment received by the first local supply node 110A is then transferred to the server 310. The server 310 updates the database to indicate that the fifth local supply node 110D is connected to the power network.

Additionally, the second local supply node 110B also sends the acknowledgment received from the fifth local supply node 110E to the first local supply node 110A. As the first local supply node 110A has already received the acknowledgment from the fifth local supply node 110E directly as indicated by the reset flag, and the acknowledgment has already been returned to the server 310, then the first local supply node 110A simply ignores the acknowledgment forwarded by the second local supply node 110B. By checking the flag, and thus avoiding sending duplicate messages to the server 310, the data transferred over the network is reduced.

After the sixth local supply node 110F has connected to the power network, an acknowledgment is sent to the second local supply node 110B. Upon receipt of the acknowledgement, the second local supply node 110B resets the flag associated with the sixth local supply node 110F and forwards the acknowledgment to the first local supply node 110A. The first local supply node 110A then forwards the acknowledgement back to the server 310. The server 310 updates the database to indicate that the sixth local supply node 110F is connected to the power network. As will be appreciated by the skilled person, this type of signalling, although effective, may have a bottleneck form at the top tiered nodes. In other words, as the acknowledgments are all fed back through the first local supply node 110A to the server 310, the amount of data that is handled by the first local supply node 110A will be very high.

A second mechanism reduces the data transferred over the network. In this mechanism, the acknowledgement from a local supply node in one tier to the local supply node in the previous tier is only sent after the local supply node receives an acknowledgment from all the local supply nodes to which the message was sent by the local supply node. For example, the second local supply node 110B would only send the acknowledgment to the first local supply node 110A after an acknowledgment was received from the fifth, sixth and seventh local supply nodes 110E, 110F and 110G. This mechanism is explained with reference to FIG. 5.

Figure 5:
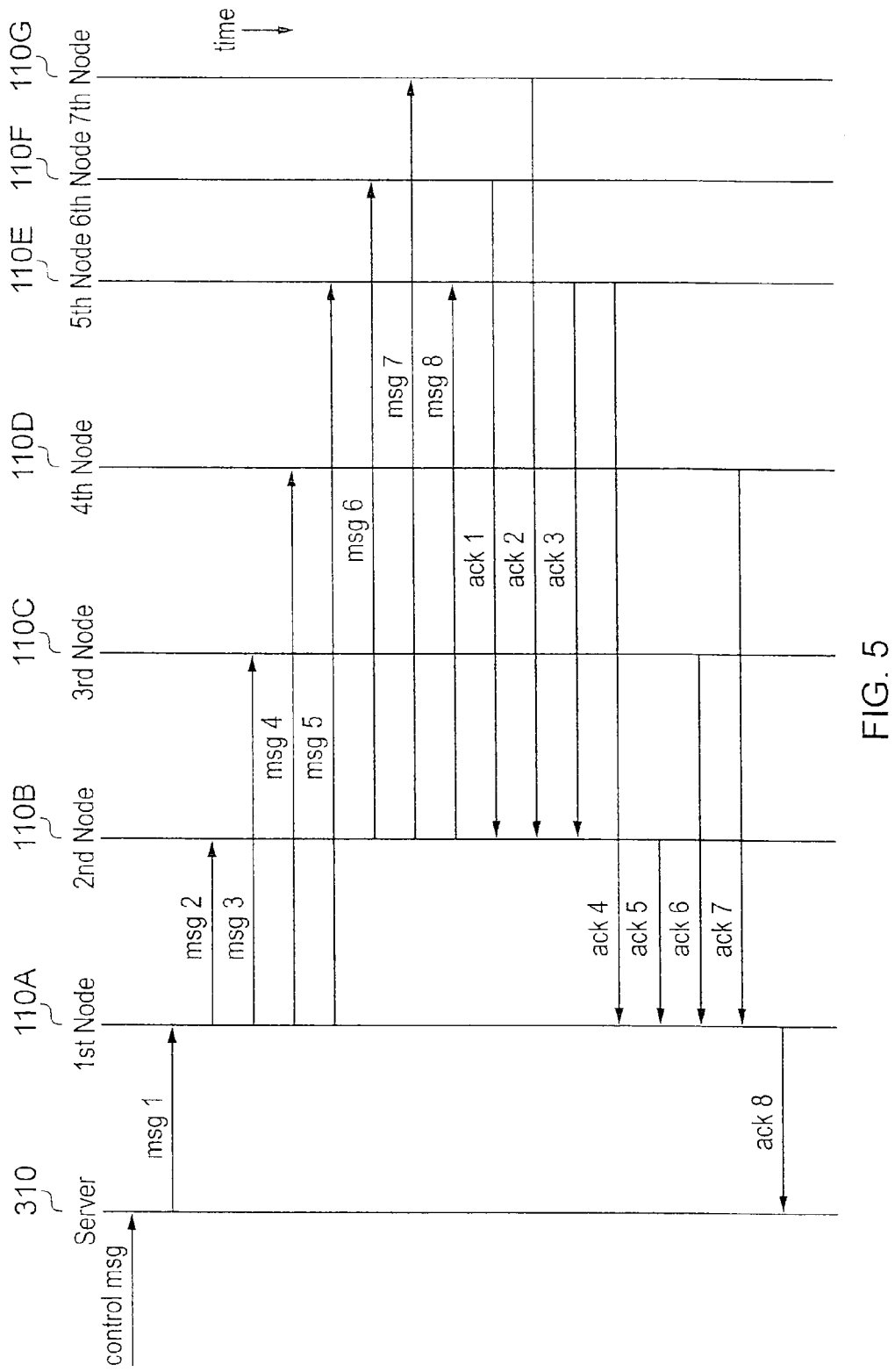
FIG. 5 shows a signal diagram of the messaging between the local supply nodes of FIG. 3.

In FIG. 5, the server 310 receives a control message from the power network. This control message indicates the geographical region and the amount of energy required. The control message may also include the time in which the amount of energy needs to be provided, although this may not be necessary. The server 310 selects the collection of local supply nodes to provide this energy as noted before.

After selection of the collection, the server 310 sends message msg1 instructing the first local supply node 110A to connect to the power network. The first local supply node 110A initiates the connection of the battery pack to the power network allowing the battery pack to either charge or discharge using the network. The first local supply node 110A sends a message msg2, msg3 and msg4 and msg5 to the second, third, fourth and fifth local supply nodes 110B, 110C, 110D and 110E respectively. Each of the local supply nodes which receive the message initiate the connection of their battery pack to the power network allowing the battery pack to either charge or discharge using the network.

The second, third, fourth and fifth local supply nodes that receive the message then pass this message on to further local supply nodes. In the example of FIG. 5, only the second node 110B is shown as propagating a message. Specifically, the second local supply node 110B sends the message onto the fifth local supply node 110E, the sixth local supply node 110F and the seventh local supply node 110G. The battery packs of these nodes initiate connection to the power network allowing the battery packs to either charge or discharge via the network. The message is propagated to other local supply nodes. This mechanism is the same as explained previously.

After all the local supply nodes in the collection are connected to the power network, acknowledgements indicating that the battery packs in the local supply node are connected to the power network are passed back to the local supply nodes in the preceding tier.

So, for example, when the fifth supply node 110E, the sixth local supply node 110F and the seventh local supply node 110G and all the nodes to which they communicate the message are connected to the power network, the fifth supply node 110E, the sixth supply node 110F and the seventh local supply node 110G send acknowledgments (ack 1-3) back to the second local supply node 110B. Moreover, the fifth local supply node 110E sends an acknowledgment (ack4) back to the first local supply node 110A. As the second local supply node 110B receives the acknowledgement from the nodes to which the second local supply node 110B sends the message, and as the second local supply node 110B has also successfully connected to the power network, the second local supply node 110B sends an acknowledgment (ack5) back to the first local supply node 110A. Similarly, the third local supply node 110C sends an acknowledgment (ack6) to the first local supply node 110A and the fourth local supply node 110D sends an acknowledgement (ack7) to the first local supply node 110A.

As the first local supply node 110A has already received an acknowledgment from the second and third local supply node 110B-C, and after the first local supply node 110A is connected to the power network, the first local supply node 110A sends an acknowledgement (ack8) to the server 310. The server 310 upon receipt of ack8 knows that all the local supply nodes in the collection are connected to the network.

As can be seen, the local supply node in one tier only sends an acknowledgement back to the local supply node in the previous tier after the local supply nodes in the following tier sends an acknowledgment. This reduces the amount of data sent over the network. This is because with the system of FIG. 5, each local supply node only ever receives acknowledgments from the nodes with which it communicates rather than the local supply nodes which are located near the server 310 in the chain being inundated with acknowledgments. This reduces the likelihood of a bottleneck in the top tiered nodes such as the first local supply node 110A, for example.

It should be noted that if the connection between a pair of nodes fails, an acknowledgement would not be received. Accordingly, if, after a predetermined period of say 5 seconds there is no acknowledgment received, the polling node would resend the message. If after a further period of 5 seconds there is no acknowledgement received from the subsequent node, then the polling node assumes that the message to the subsequent node failed and that the subsequent node, and all the nodes after the subsequent node, will not be connected to the network. In this case, the polling node sends an update message to the server identifying the failed node. In response to this, the server 310 updates its reliability database and instructs the polling node to send the message to a different subsequent node. This requires the server 310 to provide the polling node with the IP address or the like of the different subsequent node.

Alternatively, the polling node has stored therein a predetermined number of different subsequent nodes. In this case, after the polling node has determined that the subsequent node will not be connected to the network, the polling node will select one of the different subsequent nodes stored therein. The polling node then tries to contact the selected subsequent node. As there is no requirement for the polling node to contact the server 310, the amount of data traffic on the network is reduced. Moreover, it is possible that in this case the selection of the different subsequent node may be made on the basis of different criteria. For example, the selection of the different subsequent node could be based on reliability of connection so that the different subsequent node with the highest reliability is selected.

Figure 6:
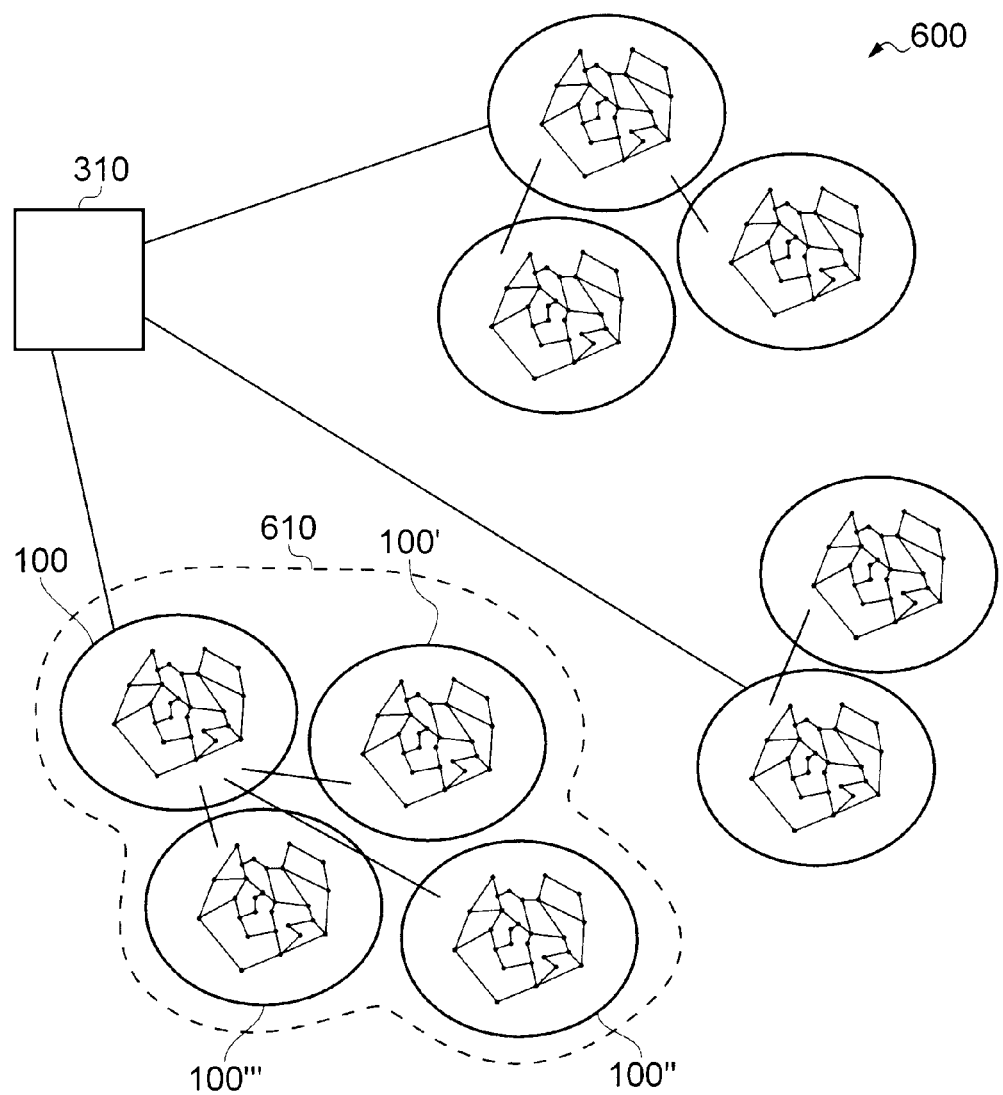
FIG. 6 shows a network of collections of local supply nodes according to a different embodiment of the present invention.

Referring to FIG. 6, a different embodiment of the present invention is disclosed. In this embodiment, like reference numerals refer to like features. A system 600 of local supply node collections 100 is shown. Unlike the embodiment of FIG. 3 where each collection 100 is connected to the server 310, in this embodiment, only one of the collections in a subset of collections is connected to the server 310.

As the server 310 will typically control 10 000 collections of nodes, the arrangement of FIG. 6 provides scalability by allowing a larger number of collections of nodes to be controlled by one server 310. This would allow each collection of nodes to either be made smaller, thus increasing the flexibility of the system or would allow a larger geographical area to be covered under the control of one server. This would reduce the overall cost of the system. In other words, the arrangement of FIG. 6 provides scalability of collections connected to one server compared with the embodiment of FIG. 3.

In order to control the collections not connected to the server 310, the collection of local supply nodes connected to the server 310 is a hub collection of nodes which controls the dissemination of the message and the acknowledgments between the collection of local supply nodes and the server 310. In order to provide this function, the hub collection of local supply nodes is connected to each of the collections of the local supply nodes in the subset. So in the example of FIG. 6, collection 100 is the hub collection of subset 610. Collection 100 is connected to collections 100', 100", 100'". These are controlled by hub collection 100. It should be noted here that within the subset of collections 610, only the hub collection 100 needs to communicate with the other hubs; there is no requirement for each of the other collections in the subset to communicate with each other, although the invention is not so limited.

Figure 7:
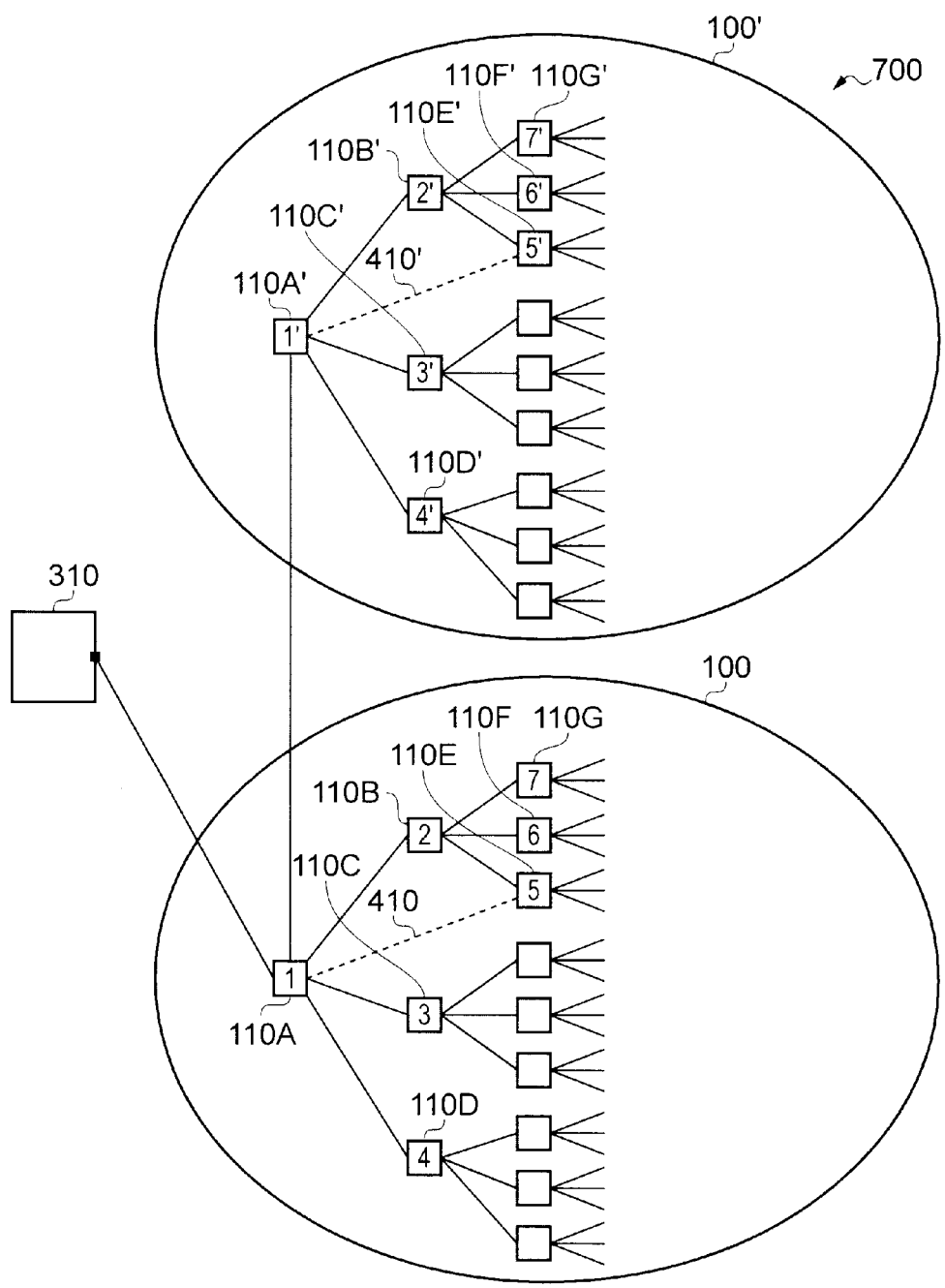
FIG. 7 shows a diagram explaining the messaging amongst the collection of local supply nodes of FIG. 6.

Referring to FIG. 7, a subset 700 showing a hub collection 100 connected to a slave collection is shown. The hub collection 100 is the same as the first collection that described with reference to FIG. 3. The hub collection 100 is connected to the server 310. The slave collection 100' is similar to the first collection 100. However, in the slave collection 100', instead of the first local supply node 110A' being connected to the server 310, the first local supply node 110A' in the slave collection 100' is connected to the first local supply node 110A of the hub collection 100.

In terms of operation, therefore, the slave collection 100' operates in a very similar manner to the operation of the hub collection 100 explained with reference to FIG. 3. The only difference is that the first local supply node 110A' in the slave collection 100' receives the message from the first local supply node 110A of the hub collection 100 and then sends the acknowledgment back to the first local supply node 110A of the hub collection 100. The first supply node 110A of the hub collection 100 receives the acknowledgment from the first supply node 110A' of the slave collection 100'. The server 310 receives the acknowledgement from the first supply node 110A of the hub collection 100. The transfer of the messages and acknowledgements between the different nodes use the same technique as discussed with reference to FIG. 3.

A description of the table stored in the database is shown with reference to FIG. 8. The table shown in FIG. 8 specifically relates to database stored in the server 310 of FIGS. 3 and 7. In this table three columns are provided. The first column 905 uniquely identifies the local supply nodes. In the example of FIG. 8, each local supply node in each collection of local supply nodes is uniquely identified. Each node in one collection of nodes (Group A, Group B etc) is numbered and the same numbering system (Node 1, Node 2, Node 3 etc) is used to identify the nodes in a different collection. So, each node will be uniquely identified as A1, A2, B1, B2 etc to each server 310. However, the invention is not so limited and any kind of unique identification may be used.

In order to allow the different local supply nodes to be dynamically placed in different collections, and even under the control of different servers the identification applied to each local supply nodes may be globally unique, for example an IP address.

A second column 910 provides the energy charge that may be provided by each local supply node. The energy charge value is periodically updated to ensure that the energy charge is current. This update may be provided in response to a request from the server, or in response to a trigger event, such as after charging or discharging. Alternatively, the updated value may be provided automatically after a predetermined time.

A third column 915 provides details of the reliability of the connection of the local supply node. The reliability of the connection is a measure indicating how often the connection from the local supply node to either the server 310, or nodes with which the specific node communicates fails. When the reliability of the connection drops below a threshold, for example 85%, a communication line such as line 410 in FIG. 4 is generated. In other words, if the reliability drops below a threshold, the server 310 provides the IP address of one or more nodes with which the node having the poor reliability communicates to a node in an earlier tier that has a high reliability, for example in excess of 97%.

Indeed, the order in which the nodes receive the message may be dependent upon the reliability of the connection. Specifically, upon initiation of the collection, the order of propagation of the message may be randomly selected or may be selected using any criterion, such as geographical distance to the server 310. Over time, however, the order may be changed dynamically in dependence upon the reliability of the connection. Indeed, the first node (i.e. the node with which the server 310 communicates) may have the most stable and most reliable connection. The second tier of nodes (i.e. those nodes connected to the first node) will have the second most reliable connection. The third tier of nodes (i.e. those nodes connected to the second nodes) will have the third most reliable connection. This is advantageous because the system requires the message and acknowledgment to propagate through the tiers. Therefore, if a node in a low numbered tier does not communicate the message or acknowledgement, then a large number of nodes in later tiers will not receive the message. However, if nodes in later tiers do not receive the message, then a smaller number of subsequent nodes will be effected.

In other words, if the reliability of the connection between node 110A and 110B is below a threshold, then in order to ensure that there remains propagation of messages through the collection of nodes, node 110A is also connected to node 110D. Therefore, should the message not propagate to node 110B, then at least node 110D will receive the communication from node 110A enabling propagation of the message through the collection of nodes.

As noted hereinbefore, a message is sent to each node which instructs the node receiving the message to connect to the power network. In embodiments, the message will include the unique identifier of the sending node to assist in the routing of the acknowledgement. This is particularly important when two or more nodes send the message to the same node. The acknowledgement from the node will, in embodiments, include the unique identifier of the node which has connected to the power network. This enables the node receiving the acknowledgement to reset the flag associated with that node.

The update message which informs the server 310 of the charge in any one node includes the amount of charge in the battery pack, and the unique identifier for the node. This allows the server to update the database.

The above embodiments may be implemented as a computer program having computer readable instructions. The computer program will contain instructions that allow a computer to perform a method as hereinbefore described. Such a computer program may be embodied on a storage medium such as a CD-ROM or a solid state memory or any kind of storage device suitable for storing such a computer program. Moreover, the computer program may be embodied as signals which can be transferred over a network such as the Internet or any kind of local network.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of controlling the transfer of electricity between a collection of a plurality of electricity storage devices and an electrical power network, the plurality of electricity storage devices having a communication line therebetween, the method comprising:
   receiving a message at a first electricity storage device from a controlling device and, in response to the message
      transferring electricity between the first electricity storage device and the electrical power network independently of a second electricity storage device in one of
         a first transfer direction to the electrical power network, or
         a second transfer direction from the electrical power network; and
      sending, from the first electricity storage device to a the second electricity storage device, a second message containing data in response to which the second electricity storage device transfers electricity between the second electricity storage device and the electrical power network in the one of the first transfer direction or the second transfer direction in which the first electricity storage device transfers electricity in response to the message.

2. The method according to claim 1, further comprising: receiving, at the first electricity storage device, an acknowledgment from the second electricity storage device, and in response to said acknowledgment and the transfer of electricity between the first electricity storage device and the electrical power network, the first electricity storage device sends an acknowledgment to the controlling device.

3. The method according to claim 1, wherein the controlling device is a server or a further electricity storage device.

4. The method according to claim 2, further comprising:
   sending, from the first electricity storage device to a third electricity storage device, a third message containing data in response to which the third electricity storage device transfers electricity to or from the electrical power network,
   receiving from the third electricity storage device an acknowledgment and, in response to said acknowledgment from said second and third electricity storage devices, sending the acknowledgment to the controlling device.

5. The method according to claim 4, wherein any one of the first, second or third electricity storage device transfers energy to or from the electrical power network.

6. The method according to claim 1, wherein the first electricity storage device has an identifier stored thereon, the identifier uniquely identifying the second electricity storage device in the collection whereby the identifier is used to route the second message to the second electricity storage device.

7. The method according to claim 6 further comprising:
   selecting a different electricity storage device within the collection as the second electricity storage device, wherein the different electricity storage device has a unique identifier attributed thereto, and updating the identifier stored in the first electricity storage device to be the different unique identifier, wherein the selection is made in dependence upon the reliability of the communication line to the second electricity storage device and to the different electricity storage device.

8. The method according to claim 7, wherein the reliability of the communication line to the second electricity storage device is below a threshold, and the reliability of the communication line to the different electricity storage device is above that of the communication line to the second electricity storage device.

9. The method according to claim 1, comprising periodically measuring the energy in the second electricity storage device and sending the measured energy value, and an identifier that uniquely identifies the second electricity storage device, to the first electricity storage device.

10. A non-transitory computer-readable storage medium storing computer readable instructions which, when executed by a computer, cause the computer to perform a method according to claim 1.

11. An electricity storage device operable to provide electrical energy to an electrical power network, comprising:
   a communication interface operable to communicate with
      a second electricity storage device and to receive a message at the electricity storage device from a controlling device; and
   a controller operable in response to the message to
      transfer electricity between the electricity storage device and the electrical power network independently of the second electricity storage device in one of
         a first transfer direction to the electrical power network, or
         a second transfer direction from the electrical power network; and
      using the communication interface, send to the second electricity storage device, a second message containing data in response to which the second electricity storage device transfers electricity between the second electricity storage device and the electrical power network in the one of the first transfer direction or the second transfer direction in which the controller transfers electricity in response to the message.

12. A device according to claim 11, wherein the communication interface is further operable to receive an acknowledgment from the second electricity storage device, and in response to said acknowledgment and the transfer of electricity between the first electricity storage device and the electrical power network, the communication interface is operable to send an acknowledgment to the controlling device.

13. The device according to claim 12, wherein the communication interface is operable to send to a third electricity storage device, a third message containing data in response to which the third electricity storage device transfers electricity to or from the electrical power network, and the communication interface is further operable to receive from the third electricity storage device an acknowledgment and, in response to said acknowledgment from said second and third electricity storage devices, the communication interface is operable to send the acknowledgment to the controlling device.

14. The device according to claim 13 wherein any of the device, the second electricity storage device, or the third electricity storage device is operable to transfer energy to or from the electrical power network.

15. A device according to claim 11, wherein the controlling device is a server or a further electricity storage device.

16. The device according to claim 11, comprising a memory operable to store an identifier thereon, the identifier uniquely identifying the second electricity storage device in the collection whereby the identifier is used to route the second message to the second electricity storage device.

17. The device according to claim 16, wherein the controller is further operable to select a different electricity storage device within the collection as the second electricity storage device, wherein the different electricity storage device has a unique identifier attributed thereto, and to update the identifier stored in the memory to be the different unique identifier, wherein the selection is made in dependence upon the reliability of the communication line to the second electricity storage device and to the different electricity storage device.

18. The device according to claim 17, wherein the reliability of the communication line to the second electricity storage device is below a threshold, and the reliability of the communication line to the different electricity storage device is above that of the communication line to the second electricity storage device.

19. The device according to claim 11, comprising a charge measurement device operable to periodically measure the available energy and wherein the communication interface is operable to send the measured energy value, and an identifier that uniquely identifies the second electricity storage device, to the controller.

\* \* \* \* \*